(12) United States Patent
Holden

(10) Patent No.: US 6,446,943 B1
(45) Date of Patent: Sep. 10, 2002

(54) GAS SPRING PRESSURE RELEASE MECHANISM

(75) Inventor: Thomas J. Holden, Warrington, PA (US)

(73) Assignee: Strongarm Designs, Inc., Horsham, PA (US)

( * ) Notice: Subject to any disclaimer, the term of this patent is extended or adjusted under 35 U.S.C. 154(b) by 8 days.

(21) Appl. No.: 10/041,457

(22) Filed: Jan. 10, 2002

Related U.S. Application Data

(60) Provisional application No. 60/266,878, filed on Feb. 7, 2001.

(51) Int. Cl.[7] ................................................. F16F 5/00
(52) U.S. Cl. ............................... 267/64.12; 267/64.12; 267/64.19; 267/118; 188/300
(58) Field of Search .................... 267/64.12, 64.19, 267/118, 122, 123, 64.28; 188/300

(56) References Cited

U.S. PATENT DOCUMENTS

| | | | |
|---|---|---|---|
| 3,831,968 A | 8/1974 | Shaffer | 280/124 |
| 4,445,671 A * | 5/1984 | Reuschenbach et al. | 267/64.12 |
| 4,993,522 A * | 2/1991 | Wagner | 188/269 |
| 5,404,972 A * | 4/1995 | Popjoy et al. | 188/277 |
| 5,791,328 A | 8/1998 | Alexander | 124/76 |
| 6,199,838 B1 * | 3/2001 | Cotter | 267/64.11 |
| 6,234,461 B1 * | 5/2001 | Bohm et al. | 267/64.12 |

\* cited by examiner

*Primary Examiner*—Chris Schwartz
(74) *Attorney, Agent, or Firm*—Gregory J. Gore

(57) ABSTRACT

A gas spring device includes a pressure adjustor having an actuator mechanism which regulates the rate of discharge through a pressure-release valve in equal bursts small enough to permit precise adjustment of the internal working pressure of the gas spring. Manually turning the actuator mechanism provides a consistent application of intermittent inertial force to the gas spring pressure-release valve so that resultant equal bursts provide a controlled release of pressure, even from imprecise manual operation. The chance of over-bleeding is eliminated since the mechanics of the actuator mechanism provides a single metered burst of released gas regardless of how quickly or slowly it is turned, thus the size of the burst is not dependent on the operator's skill. Because the adjustor mechanism is integrated directly into the device, it is compact and does not interfere with other surrounding mechanical structures.

13 Claims, 3 Drawing Sheets

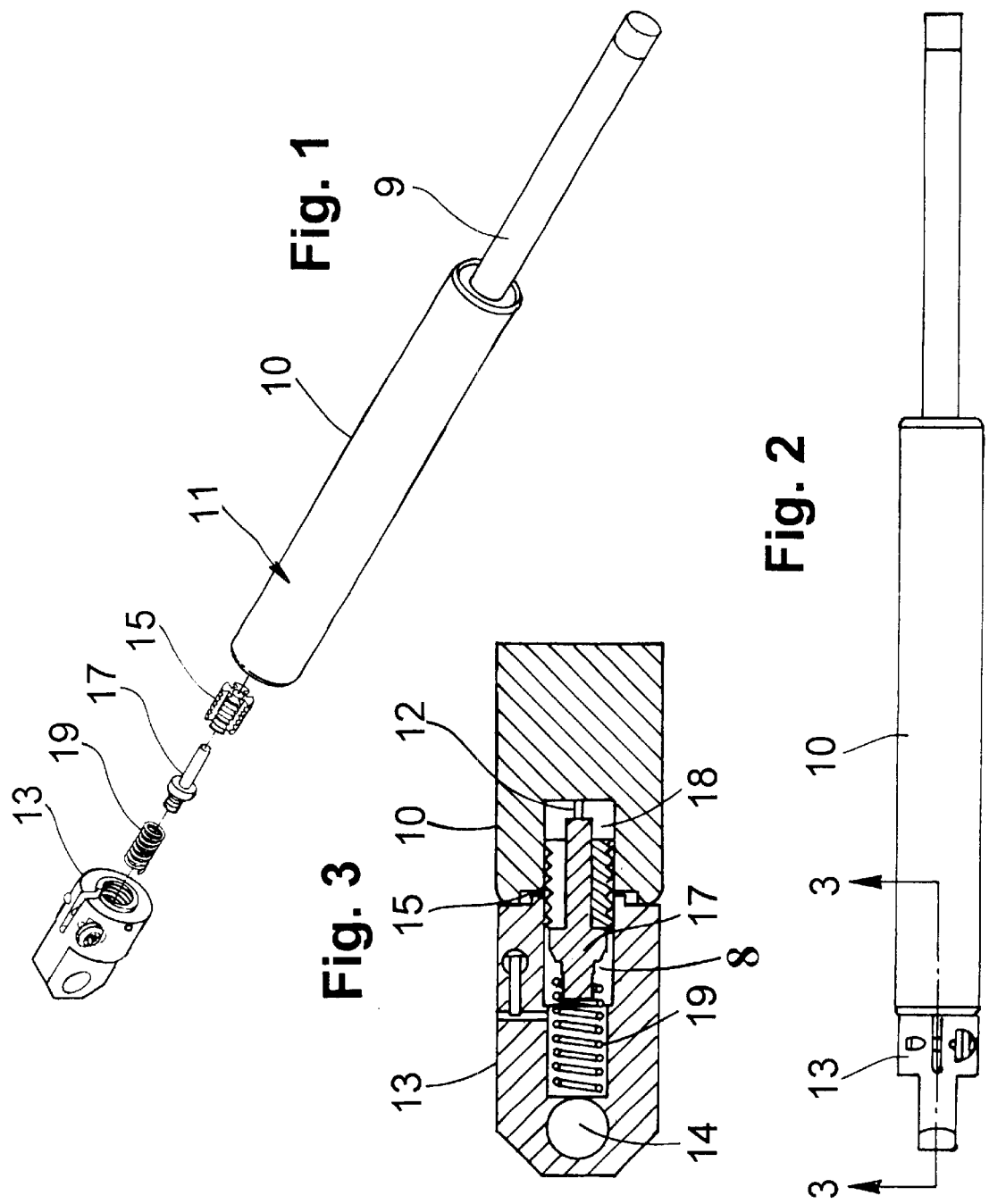

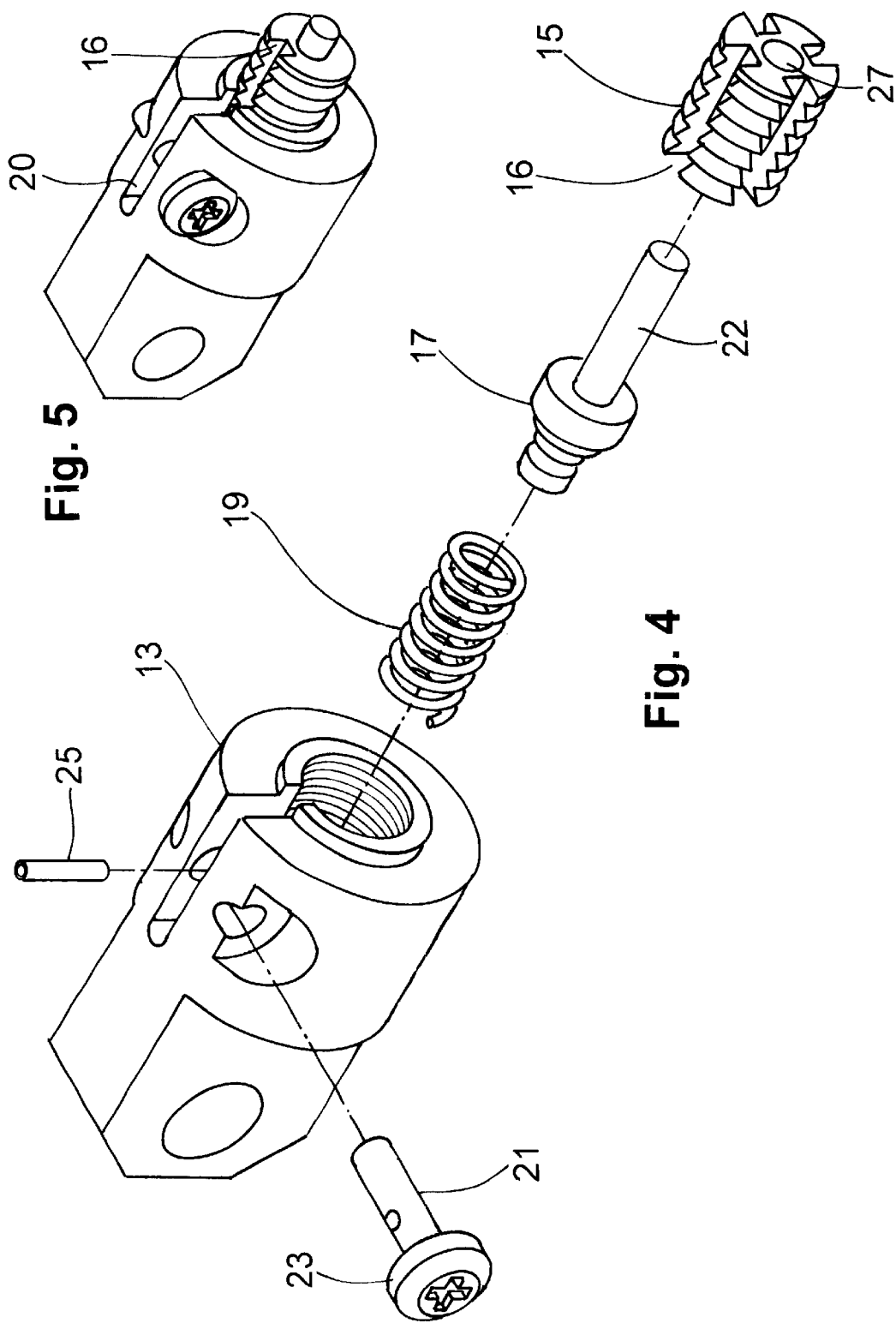

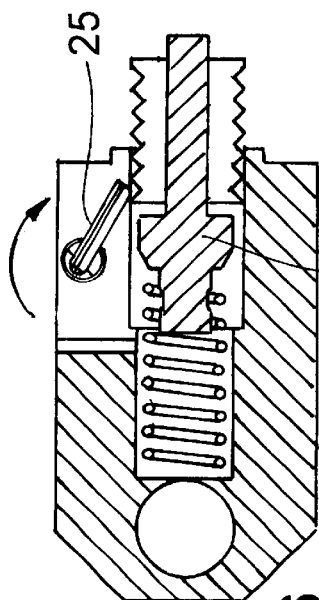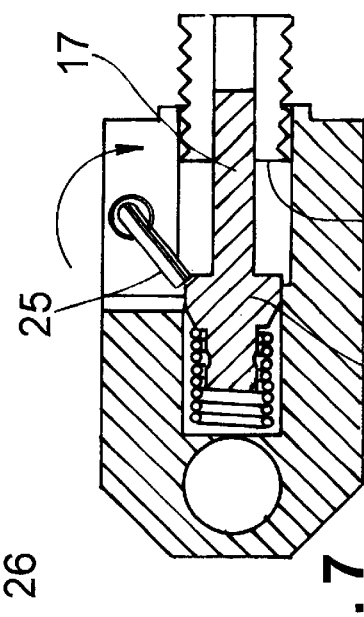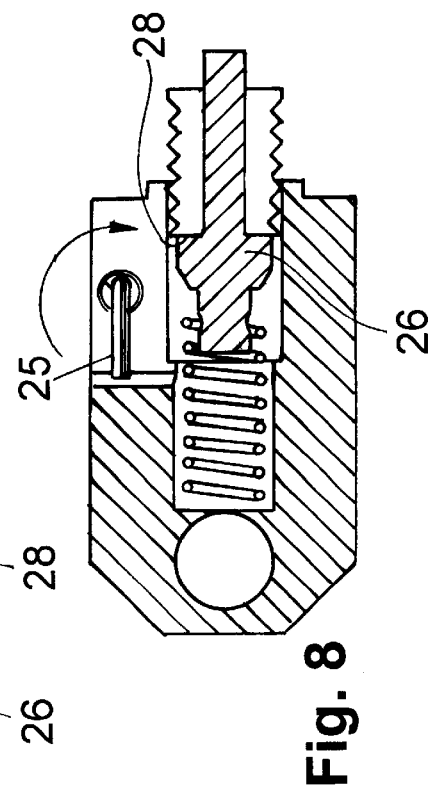

GAS SPRING PRESSURE RELEASE MECHANISM

The present application is related to provisional patent application Ser. No. 60/266,878 entitled "Gas Spring Pressure Release Mechanism" filed on Feb. 7, 2001, priority from which is hereby claimed.

FIELD OF THE INVENTION

The present invention relates to pressure valve actuators and more specifically actuators for high pressure gas release.

BACKGROUND OF THE INVENTION

Pressurized gas springs are commonly used for counterbalancing and supporting loads in It various applications. The amount of force available from the spring is supplied by pressure of the compressible gas inside of the spring where typically a full charge is around 300 psi. Since gas springs are charged to this high pressure they are preset at the manufacturer and not adjustable by the end-user. However, there are some applications where the load cannot be predetermined and adjustability by the end user is desirable.

A known solution is to build in a mechanical means of adjusting the leverage in the mechanical system in which the gas spring is used rather than reducing the gas spring pressure, which has been disregarded as an alternative because of the difficulty in metering the release of a low volume of high pressure gas. However, adding a mechanical structure such as an adjustable lever arm to regulate the net spring force is expensive and adds to the bulk and complexity of the completed assembly. There is therefore a need in the art to provide a means for adjusting the internal working pressure of a gas spring which can be done accurately and repeatably even by an end user having very little skill.

SUMMARY OF THE INVENTION

The present invention provides the end-user with a device (hereinafter "adjustor") to adjust the pressure of the gas spring to match their particular-installation. The adjustor includes a unique pressure-release actuator mechanism which regulates the rate of gas discharge to approximately equal bursts small enough to give precise adjustment through application of an inertial force to the gas spring pressure release valve. The actuator causes just one metered burst of released gas regardless of how quickly or slowly it is turned. This mechanism also eliminates the chance of over-bleeding since the size of the burst is not dependent upon the end user's skill. The adjustor is coupled directly to the end of the gas spring and also provides an attachment point for the spring. Because it is integrated directly into the device, it is compact and does not interfere with other mechanical structures in the surrounding environment.

The operation of the present invention is achieved by the use of an inertial impact element, hereinafter referred to as the "firing pin," which forceably impacts the stem of the gas spring pressure release valve. According to the invention, a manual rotary actuator spring-loads and releases the firing pin. The actuator includes a simple lever which contacts a flange on the firing pin through a sweep of its arc as it is turned. When the actuating lever contacts the firing pin flange, it first begins retracting the firing pin against the force of a drive spring. As the lever is turned farther, the spring becomes fully loaded. Finally, the firing pin is released as the end of the lever sweeps past the edge of the firing pin flange.

The firing pin is then accelerated forward, impacting the valve stem of the gas spring pressure release valve. As the firing pin impacts the valve stem and rebounds from it, the momentum of the firing pin at impact is sufficient to unseat the gas spring release valve so that a small burst of gas is released, thus reducing the working pressure of the gas spring. This impact/burst process may be repeated by continued turning of the rotary actuator until the pressure in the gas spring is reduced to the point of desired adjustment. With every 360 degree turn of the rotary actuator, the process is replicated regardless of how quickly or precisely the actuator is turned. Hence, small amounts of pressure can be incrementally, and therefore accurately, released by an operator with very little skill.

More specifically, the applicant has invented a gas spring pressure adjustment mechanism which includes an adjustor body attached to a housing of a gas spring. The adjustor body is be positioned adjacent to a gas release valve stem in the body of the gas spring. A firing pin is in slidable engagement with the adjustor body and is moveable between retracted and extended positions. When the firing pin is close to its extended position, it contacts the pressure release valve stem. A spring, acting between the adjustor body and the firing pin, forceably drives the firing pin forward toward its extended position. The firing pin is retracted and then released by a rotary actuator which includes an engagement mechanism that moves the firing pin. The engagement mechanism is preferably a lever which extends radially from an actuator shaft that contacts a flange on the firing pin along a portion of its arc as it is rotated. The invention further includes a unique method of attachment between the adjustor body and the housing of the gas spring that also provides adjustment means for limiting the forward travel of the firing pin. The mounting means comprise an interconnecting collar having male threads which engage threads in aligned bores in both the adjustor body and the gas spring housing. The collar includes an axial bore through which the firing pin travels, and the end of the collar provides a stop means for restricting the forward travel of the firing pin. An axial slot in the collar which, when fully assembled to the gas spring, is aligned with a slot in the top of the adjustor body so that the combined slots provide a cavity through which the actuator engagement means passes as the actuator shaft is turned. To prevent inadvertent or accidental actuation of the adjustor mechanism, the actuator shaft includes a head having tool drive means so that a tool must be used to turn the shaft to operate the invention.

It is therefore the main object of the present invention to provide an easily controlled gas release valve actuator for a gas spring. It is a further object of the invention to provide a gas spring pressure release valve which may be accurately used by an unskilled person. Yet a further object of the present invention is to create a high pressure release valve which is safe to use and is protected against accidental operation.

BRIEF DESCRIPTION OF THE DRAWINGS

FIG. 1 is a top right front perspective view with the pressure regulator mechanism shown in an exploded assembly view which depicts its various internal operative elements.

FIG. 2 is a top view of the apparatus shown in FIG. 1 in its assembled condition.

FIG. 3 is a side sectional view taken from FIG. 2 as shown in that figure.

FIG. 4 is a top left front exploded assembly view of the valve actuator mechanism of the present invention.

FIG. 5 is a top left front perspective view of the actuator mechanism of the present invention shown in its assembled condition.

FIGS. 6, 7, and 8 are side sectional views depicting the actuator mechanism in three sequential positions of its operation.

DESCRIPTION OF THE PREFERRED EMBODIMENT

FIG. 1 shows gas spring 11 having the pressure adjustor mechanism 13 of the invention assembled to it through interconnecting, threaded attachment collar 15. Firing pin 17 strokes through a bore in the attachment collar 15 and is driven by spring 19. The gas spring comprises gas chamber housing 10 and plunger 9. FIG. 2 is a top view of the assembled structures shown in FIG. 1. The adjustor 13 is integrated into the gas spring housing 10 device and also serves as an attachment point at one end of the spring.

FIG. 3 is a side sectional view taken from FIG. 2 showing greater detail of the components of the present invention. The end of the housing of the gas spring includes a pressure release valve stem 12 which extends axially from an end wall of a blind threaded bore 18. Likewise, the adjustor body 13 includes a threaded blind bore 8 that receives a drive spring 19 and the firing pin 17. The pressure adjustor assembly of the invention is threadably engaged to the end of the housing of the gas spring 10 through the interconnecting collar 15 which includes male threads that are in threaded engagement with female threads of aligned bores in both parts. The drive spring 19 operates between an end wall of the bore in the adjustor body and a flange of the firing pin. By these relations, the firing pin is near the end of its stroke when it contacts the valve stem. An end face of the adjustor body abuts the end of the gas spring and by way of the interconnecting collar becomes an integral force transmitting part of the gas spring. Aperture 14 at the end of the adjustor body provides a mounting point for elements attached to the gas spring assembly.

It can also be seen from this view that the forward travel of the firing pin is limited by contact with the end face of the threaded collar. By the nature of these structures, the position of the threaded collar at the joint between the adjustor body and the gas spring housing may be adjusted by threading the collar more or less deeply into the gas spring housing. This changes the position of the other end of the threaded collar in the adjustor body which regulates the firing pin's forward travel. By adjusting the position of the collar, the firing pin travels only a selected distance after it forceably impacts the end of the release valve stem. This permits adjustment of the distance that the release valve stem moves and hence the amount of gas released. Other variables that affect the amount of gas released include the drive spring force and the mass of the firing pin.

FIG. 4 depicts a close-up assembly view of the pressure adjustor is shown and FIG. 5 depicts the valve adjustor components shown in the assembly view of FIG. 4 now shown fully assembled. As shown in FIGS. 4 and 5, the rotary actuator 21 also includes a head having tool drive means 23 that is recessed into the body of the adjustor when assembled. This combination of structures makes the inadvertent turning of the actuator almost impossible since a tool is required and the actuator is protected by surrounding structure from accidental contact. The threaded collar may be further described as including a bore 27 that permits the passage of a shank 22 of the firing pin and also as having at least one axial slot 18 along its surface. Lever arm 25 in the form of a pin is inserted into the shaft of the actuator by press-fit. Slot 20 in the top of the adjustor body allows lever arm 27 to sweep through the top of its arc as the actuator is turned.

As shown in FIGS. 4 and 5, the adjustor body includes a slot 20 at the top which permits passage of the lever as it sweeps over the top of its arc after it moves past the firing point. Similarly, a slot 16 in the threaded collar allows passage of the actuator lever at the bottom of its arc. The alignment of these slots creates an internal cavity that accepts the swing of the lever through 360 degrees of rotation and provides a very compact construction. The inclusion of multiple slots in the threaded collar as shown in FIG. 4 permits a finer positional adjustment of the threaded collar into the adjustor body at points separated by 90 degrees of rotation of the collar rather than the courser adjustment of positions 360 degrees apart provided by the embodiment shown in FIG. 5 in which the threaded collar has only a single slot.

FIGS. 6, 7, and 8 show various positions of the rotary actuator as the invention is operated. These views are similar to FIG. 3 to which description of the individual parts has already been made and need not be repeated. In FIG. 6, the actuation lever arm 25 is just in front of the firing pin flange 26 and as the actuator is turned clockwise, the end of the lever sweeps through the slot in the threaded collar at the bottom of its arc until it contacts the flange of the firing pin. Referring now to FIG. 7, by further rotation the actuator has retracted the firing pin 17 against the force of the drive spring and is now at the point of release. FIG. 8 shows the rotary actuator turned yet farther and shows the position of the firing pin now fully extended having been forceably driven forward until the flange abuts the end face 28 of the connecting collar. Just prior to reaching its fully-extended position as shown in FIG. 8, the end of the firing pin impacts the end of the valve stem of the gas spring release valve as shown in FIG. 3. Turning the actuator even farther moves the lever through the slot in the top of the adjustor body until it is returned to the position shown in FIG. 6 where it is once again positioned just in front of the firing pin flange. These steps of retraction, release, and extension are repeated through each 360 degrees of rotation of the rotary actuator. As described above, this unseats the gas spring release valve just momentarily before the firing pin rebounds, thus expelling a short burst of pressurized gas and reducing the internal pressure of the gas spring which in turn reduces its spring force.

It will be understood from the foregoing description of the invention and a preferred embodiment thereof that the various objects of the present invention have been met. It should be understood that there are other modifications and adaptations that may be made to the disclosed embodiment without departing from the scope and spirit of the invention which is to be defined only by the following claims and their legal equivalents.

What is claimed is:

1. A gas spring pressure adjustment mechanism, comprising:
    an adjustor body attached to a housing of a gas spring, said adjustor body positioned adjacent to a gas release valve stem in the body of said gas spring;
    a firing pin in slidable engagement with said adjustor body moveable between retracted and extended positions, said firing pin contacting said pressure release valve stem when proximate to said extended position;

spring means acting between said adjustor body and said firing pin for forceably driving said firing pin forward toward said extended position;

an actuator shaft rotatably mounted to said adjustor body; and engagement means affixed to said actuator shaft for retracting and releasing said firing pin as said actuator is rotated.

2. The mechanism of claim 1 further described in that said engagement means is a lever extending radially from said actuator shaft.

3. The mechanism of claim 1 wherein said actuator shaft further includes a head having tool drive means.

4. The apparatus of claim 2 further including a flange on said firing pin, said flange engaging said lever as said actuator is rotated whereby said firing pin is retracted against the force of the spring means.

5. The mechanism of claim 1 wherein said adjustor body and said housing are threadably attached by an interconnecting collar having male threads at opposite ends, one end engaging a threaded bore in said adjustor body while threads in the other end engage a threaded bore in said housing.

6. The mechanism of claim 5 wherein said collar includes an axial bore through which said firing pin travels.

7. The mechanism of claim 5 wherein said collar includes an axial slot along its outer surface aligned with a slot in the top of said adjustor body, said slots providing a cavity through which said lever passes as said actuator is turned.

8. The mechanism of claim 1 wherein said spring means is a coil spring.

9. The mechanism of claim 3 wherein said head of said actuator shaft is recessed into an outer surface of said adjustor body.

10. The mechanism of claim 6 wherein an end face of said collar provides stop means for restricting the forward travel of said firing pin.

11. The mechanism of claim 1 wherein a first end of said adjustor body abuts the end of the gas spring housing in a manner transmitting force of the gas spring through the adjustor body to an external structure connected thereto.

12. The mechanism of claim 11 wherein an opposite end of the adjustor body includes attachment means.

13. The mechanism of claim 5 wherein the position of said collar with respect to the travel of said firing pin is adjustable by threading said collar more or less into said housing.

* * * * *